(12) United States Patent
Huang et al.

(10) Patent No.: US 8,485,729 B2
(45) Date of Patent: Jul. 16, 2013

(54) SELF-COMPENSATING HYDROSTATIC JOURNAL BEARING

(75) Inventors: Hua-Chih Huang, Taichung (TW); Po-Chun Yaung, Pingtung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 185 days.

(21) Appl. No.: 13/098,069

(22) Filed: Apr. 29, 2011

(65) Prior Publication Data

US 2012/0141055 A1    Jun. 7, 2012

(30) Foreign Application Priority Data

Dec. 3, 2010    (TW) ................................ 99142045 A

(51) Int. Cl.
*F16C 32/06*    (2006.01)
(52) U.S. Cl.
USPC ............................................................ 384/100
(58) Field of Classification Search
USPC ................................................... 384/12, 100
See application file for complete search history.

(56) References Cited

U.S. PATENT DOCUMENTS

| | | | |
|---|---|---|---|
| 2,449,297 A * | 9/1948 | Hoffer | 384/115 |
| 3,271,086 A * | 9/1966 | Deffrenne | 384/12 |
| 3,934,948 A | 1/1976 | Pruvot et al. | |
| 4,232,913 A * | 11/1980 | Nilsson | 384/100 |
| 4,710,035 A * | 12/1987 | Vaughn | 384/115 |
| 5,017,023 A * | 5/1991 | Scharrer et al. | 384/114 |
| 5,104,237 A | 4/1992 | Slocum | |
| 5,281,032 A | 1/1994 | Slocum | |
| 5,391,002 A * | 2/1995 | Eigenbrod | 384/12 |
| 5,484,208 A | 1/1996 | Kane et al. | |
| 5,533,814 A | 7/1996 | Slocum | |
| 5,700,092 A | 12/1997 | Wasson et al. | |

(Continued)

FOREIGN PATENT DOCUMENTS

| | | |
|---|---|---|
| DE | 4212630 A1 | 10/1992 |
| EP | 0105050 A1 | 4/1984 |

(Continued)

OTHER PUBLICATIONS

Japan Patent Office, "Office Action", Nov. 20, 2012, Japan.

(Continued)

*Primary Examiner* — Thomas R Hannon
(74) *Attorney, Agent, or Firm* — Morris Manning & Martin LLP; Tim Tingkang Xia, Esq.

(57) ABSTRACT

A self-compensating hydrostatic journal bearing is disclosed, which is substantially a base provided for a spindle to mounted thereat passing through a hole thereof, while allowing a gap to be formed between the circumference surface of the hole and the spindle for a hydraulic fluid to flow therethrough. There are at least two oil holes formed on the base, and correspondingly, there are at least two first chambers formed on the circumference surface for allowing each first chamber to be in fluid communication with one of the at least two oil holes, and for each first chamber, there is one second chamber being arranged in the vicinity thereof. When the spindle is forced to bias, the gap axially opposite to the bias is changed for causing the hydraulic fluid to flow inside the channels between the first chambers and the second chambers correspondingly and thus accomplishing a fluid self-compensating process.

18 Claims, 3 Drawing Sheets

U.S. PATENT DOCUMENTS

| | | | |
|---|---|---|---|
| 5,980,110 A | 11/1999 | Lyon | |
| 6,012,845 A | 1/2000 | Lyon | |
| 2004/0013327 A1* | 1/2004 | Mukai et al. | 384/100 |
| 2006/0251346 A1* | 11/2006 | Wasson et al. | 384/12 |

FOREIGN PATENT DOCUMENTS

| | | |
|---|---|---|
| JP | 62028518 | 2/1987 |
| JP | 63203918 A | 8/1988 |
| JP | 6026523 A | 2/1994 |
| TW | 225576 | 6/1994 |
| TW | 304221 | 5/1997 |
| TW | 435628 U | 5/2001 |
| TW | 489183 | 6/2002 |
| TW | I250254 B | 3/2006 |
| TW | M320617 U | 10/2007 |
| TW | 200812754 A | 3/2008 |
| TW | I299014 | 7/2008 |
| TW | 201014990 | 4/2010 |
| TW | 201018819 A | 5/2010 |
| TW | M390375 U1 | 10/2010 |
| WO | 9953207 A1 | 10/1999 |

OTHER PUBLICATIONS

Nenzi Wang et al., Comparison of Surrogate Models for Modeling Island—Type Hydrostatic Bearings, World Tribology Congress, Sep. 2009, Kyoto, Japan.

Hua-Chih Huang et al., Development of Self-compensating Hydrostatic Bearing Pads for Machine Tool Slideway Ssystems, Proceedings of the euspen International Conference, Jun. 2009, San Sebastian.

German Patent and Trade Mark Office (DPMA), "Office Action", Feb. 11, 2013, Germany.

Intellectual Property Office, Ministry of Economic Affairs, R.O.C., "Office Action", Mar. 19, 2013, Taiwan.

* cited by examiner

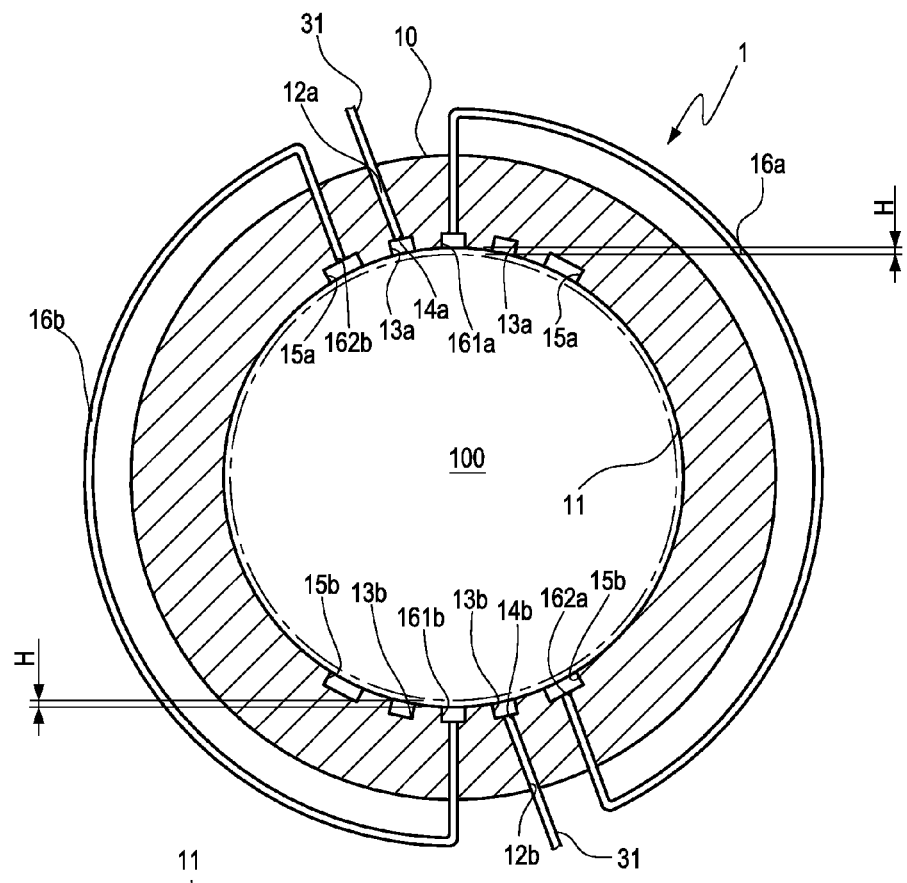
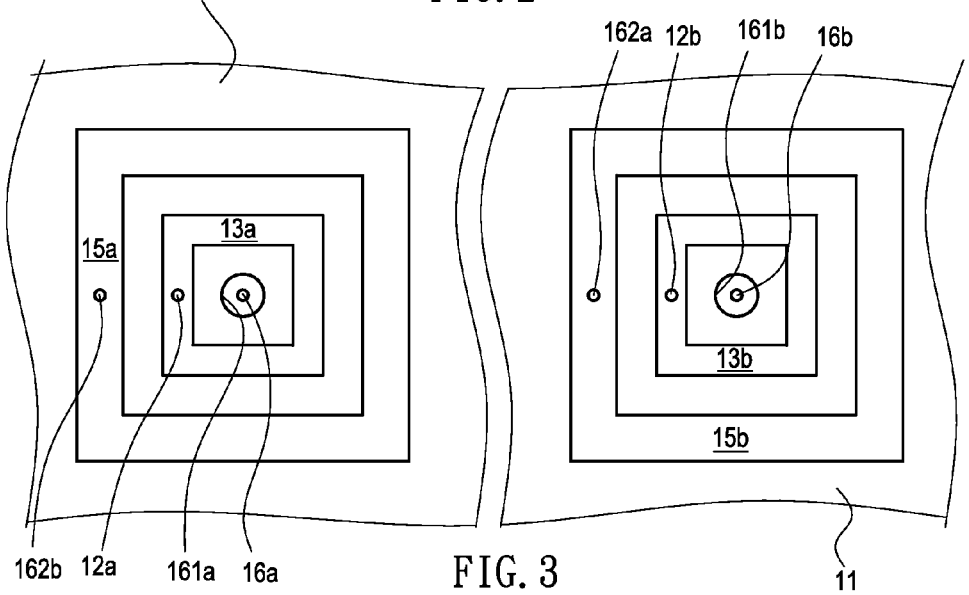

SELF-COMPENSATING HYDROSTATIC JOURNAL BEARING

CROSS-REFERENCE TO RELATED APPLICATION

This non-provisional application claims priority under 35 U.S.C. §119(a) on Patent Application No. 099142045 filed in Taiwan, R.O.C. on Dec. 3, 2010, the entire contents of which are hereby incorporated by reference.

TECHNICAL FIELD

The present disclosure relates to a structure of hydrostatic journal bearing, and more particularly, to a low-cost hydrostatic journal bearing with self-compensating ability.

TECHNICAL BACKGROUND

In response to the fulfill the ever demanding requirements of ultra-precision micromachining system, a hydrostatic bearing, that is designed to use nothing more than a thin film of fluid or gas to support its load, resulting very small friction between the outer casing of the bearing and the shaft it supports, is becoming the essential component for more and more high-accuracy machine tools.

Comparing with the aerostatic bearing, the hydrostatic bearing is superior in its rigidity, damping performance and ability to eliminate vibration in a milling process, that in addition to its micro/nano-scale positioning accuracy in precision movement, make the hydrostatic bearing ideal for high precision applications such as ultra-precision milling machine. Nowadays, almost every high-accuracy machine tool in the world adopts the hydrostatic bearing system in its guide rail system.

Generally, a typical hydrostatic bearing unit for machine tools with constant-pressure oil supply system is composed of a hydrostatic bearing, an external oil supply and at least one restrictor, in which the hydrostatic bearing can be a hydrostatic journal bearing that is also known as the hydrostatic radial bearing as it is designed for supporting radial loads.

The hydrostatic journal bearing units that are current available on the market to be used in machine tools can be divided into two categories, which are the type without flow compensation and the type with flow compensation.

For the type of hydrostatic journal bearing units without flow compensation, such hydrostatic journal bearing unit is primarily composed of a hydrostatic journal bearing and a restrictor, and that is constructed without oil conduits in fluid communication between two oil chambers that are disposed opposite to each other for flow and pressure compensation. Such hydrostatic journal bearing unit without flow compensation can typically be exemplified by a hydrostatic spindle bearing assembly disclosed in TW Pat. No. M320617, which is composed of: a detachable open-ended cylinder, disposed inside a spindle base of a platform while having at least one bearing configured therein so as to be provided for a spindle to mounted thereat; and a plurality of pressure pouches, disposed inside the bearing and each being configured with a pressure sensor and a nozzle. Accordingly, by connecting each nozzle to a pressure intensifier by a channel while connecting each pressure sensor a controller for controlling all the pressure intensifiers, the spindle can be maintained to rotate without bias in a self regulating manner with very fine tolerance control.

However, since the self regulating of this type of hydrostatic journal bearing units is not enabled by the flow compensation mechanism, but is enabled through the restrictors, it is conceivable that radial loading capacity as well as the rigidity of the aforesaid hydrostatic journal bearing might not be satisfactory so that such hydrostatic journal bearing can only suitable of low-load applications, but not for middle-load or even high-load applications.

For the type of hydrostatic journal bearing units with flow compensation, such hydrostatic journal bearing unit is constructed with oil conduits in fluid communication between two oil chambers that are disposed opposite to each other for flow and pressure compensation in addition to the assembly of a hydrostatic journal bearing and a restrictor, and thereby, its radial loading capacity and rigidity are improved. There are different designs for the hydrostatic journal bearing units with flow compensation. One of which is the design having the oil chambers formed on the axis of its spindle, as the one disclosed in U.S. Pat. No. 5,700,092. However, in the aforesaid design, since the formation of the oil chamber can be restricted by many factors such as the size of the axis, the design of the oil chamber is restricted in shape and size. Another design will have the oil chamber to be formed on the sleeve of the spindle, as the one disclosed in U.S. Pat. No. 5,281,032. Since the design freedom of the oil chamber is comparatively higher due to the fact that it is ease to alter the dimension specification of the sleeve, this type of design is most common in the hydrostatic journal bearing units available today.

In detail, in the U.S. Pat. No. 5,700,092, there are a plurality of pressure supply grooves formed on the sleeve of the spindle and correspondingly, there are a plurality of collector grooves formed on the surface of the spindle that are equally spaced around the spindle with circumferential arc length on the order of 60 angular degrees. Moreover, single or multiple groove pocket shapes are circumferentially spaced and equal in number to the number of collector grooves and axially displaced from the collector grooves, and thereby, flow channels are provided either by holes drilled in the collector grooves through chords of the spindle traversing the same to connect to one corner of the pocket, or by surface grooves formed along the external spindle surface to traverse the same, such that when fluid flows axially from the pressure grooves across the spindle into the collector grooves, in proportion to the radial clearance between the spindle surface and the bore, it can flow to the pocket opposite to the collector, and thus act to provide a restoring force in proportion to the radial displacement of the spindle. Nevertheless, although the aforesaid disclosure can provide a new and improved self-compensating hydrostatic journal bearing, it is disadvantageous in its high manufacturing cost resulting from its complex structure and the machining to the sleeve and the spindle for forming those corresponding grooves. Moreover, since the support rigidity of the spindle in the aforesaid disclosure is increased with the increasing of its rotation speed, the hydrostatic journal bearing of the aforesaid disclosure is not suitable for middle-load and low-load applications.

On the other hand, in the U.S. Pat. No. 5,281,032, circular annular pressurized-fluid-receiving grooves provided in the opposed housing bearing surfaces are used for regulating the fluid fed to longitudinal recess pockets formed in the opposing bearing surfaces, at an angle to avoid the occurrence of turbulence, to provide a thin film or layer of pressurized fluid in the gaps between a shaft and the opposing bearing surfaces; the regulation establishing differential pressures in the opposing bearing surface pockets to compensate for loads applied to opposite sides of the bearing. Although the hydrostatic journal bearing of the aforesaid disclosure is also self compensating, it is only suitable for the type of bearings whose spindles are only capable of unidirectional rotations since its pressurized-fluid-receiving grooves are connected to longitudinal recess pockets formed in the opposing bearing surfaces at an angle, and thus the usage of such hydrostatic journal bearing is limited.

Therefore, it is in need of a hydrostatic journal bearing with self-compensating ability that is low in cost and high in reliability.

TECHNICAL SUMMARY

The object of the present disclosure is to provide a low-cost hydrostatic journal bearing with self-compensating ability.

To achieve the above object, the present disclosure provides a self-compensating hydrostatic journal bearing, comprising: a base, having a hole formed therein so as to be provided for receiving and mounting a spindle, while allowing a gap to be formed between the circumference surface of the hole and the spindle for a hydraulic fluid to flow therethrough; at least two oil holes, formed extending from the circumference of the base toward the inside of the same; at least two first chambers, formed on the circumference surface at positions opposite to each other for allowing each first chamber to be in fluid communication with one of the at least two oil holes; at least two second chambers, each being disposed on the circumference surface at a position in the vicinity of one corresponding first chamber of the at least two first chambers; and at least two channels, each configured with a first end and a second end in a manner that the first end of each channel is arranged boring through the base to the circumference surface and positioned neighboring to one of the at least two first chambers, and the second end of the referring channel is arranged for enabling the same to be in fluid communication with one second chamber that is positioned opposite to the first end.

By arrange each first chamber and its corresponding second chamber at positions neighboring and opposite to another first and second chambers that are paired with the foregoing first and second chambers in respective, while enabling the first end of the corresponding channel to connected to the first chamber and the second end to the second chamber that is disposed opposite to the referring first chamber, when the spindle is forced to bias in a bias direction, the gap opposite to the bias direction is changed for causing the hydraulic fluid to flow inside the channels between the first chambers and the opposite second chambers correspondingly and thus accomplishing a self-compensating process to support the spindle in the base and thus enable the spindle to rotate smoothly inside the base. As each first chamber, each second chamber and each channel are formed directly on the base by a machining process, the manufacturing cost of the self-compensating hydrostatic journal bearing can be reduced since the machining process is ease to perform.

In an exemplary embodiment, there is a flow regulating valve being arranged at a position between each oil hole and its corresponding first chamber, which can be a device selected from the group consisting of: a capillary restrictor, an orifice restrictor, a porous restrictor, and an inherent restrictor.

In an exemplary embodiment, each flow regulating valve is configured on the base by a process selected from the group consisting of: an assembling process and a machining process.

In an exemplary embodiment, the first chambers are disposed 180 degrees opposite to each other.

In an exemplary embodiment, the second chambers are disposed 180 degrees opposite to each other.

In an exemplary embodiment, the first ends of the channels are disposed 180 degrees opposite to each other.

In an exemplary embodiment, each of the first chambers is arranged surrounding the first end of each channel, and each of the second chamber is arranged surrounding each first chamber.

In an exemplary embodiment, each first chamber is formed as a groove in a shape, which is selected from the group consisting of: a rectangle and a circle, surrounding the first end of each channel.

In an exemplary embodiment, each second chamber is formed as a groove in a shape that is selected from the group consisting of: a rectangle and a circle, surrounding each first chamber.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 2 is a cross sectional view of a self-compensating hydrostatic journal bearing according to the present disclosure.

FIG. 3 is a developed view of a circumference surface in a self-compensating hydrostatic journal bearing according to the present disclosure.

DESCRIPTION OF THE EXEMPLARY EMBODIMENTS

Figure 1:
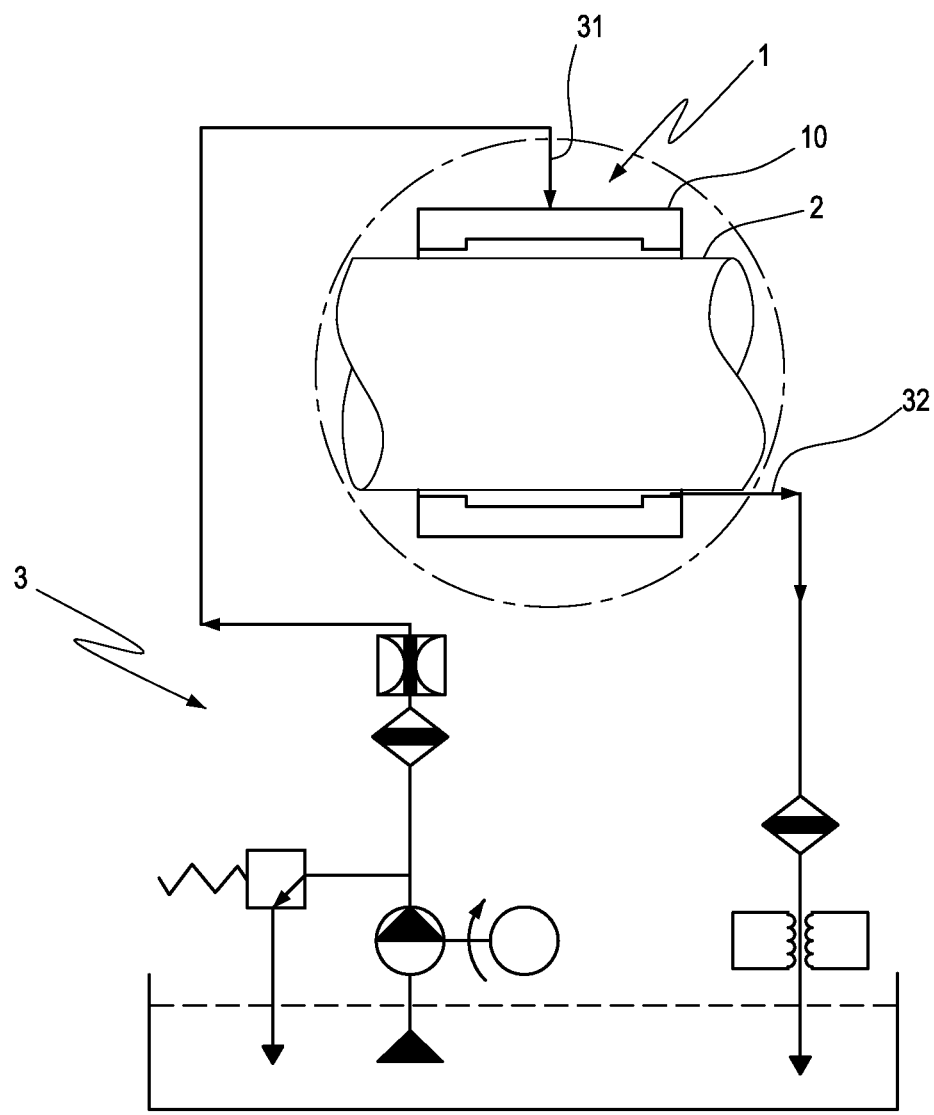
FIG. 1 is a schematic diagram showing the configuration of a self-compensating hydrostatic journal bearing according to the present disclosure.

For your esteemed members of reviewing committee to further understand and recognize the fulfilled functions and structural characteristics of the disclosure, several exemplary embodiments cooperating with detailed description are presented as the follows.

Please refer to FIG. 1 to FIG. 4, which are a schematic diagram showing the configuration of a self-compensating hydrostatic journal bearing according to the present disclosure; a cross sectional view of a self-compensating hydrostatic journal bearing according to the present disclosure; a developed view of a circumference surface in a self-compensating hydrostatic journal bearing according to the present disclosure; and a schematic diagram showing an operating self-compensating hydrostatic journal bearing according to the present disclosure.

As shown in FIG. 1 to FIG. 4, the self-compensating hydrostatic journal bearing 1 is formed substantially as a base 10 provided for a spindle 2 to mounted thereat passing through a hole 100 formed thereon, while allowing a gap H to be formed between the circumference surface 11 of the hole 100 and the spindle 2 for a hydraulic fluid to flow therethrough.

In addition, there are at least two oil holes, i.e. the oil holes 12a and 12b, formed on the base 10 that are disposed opposite to each other while extending from the circumference of the base 10 toward the inside of the same, and correspondingly, there are at least two first chambers, i.e. the first chambers 13a and 13b, formed on the circumference surface 11 at positions corresponding to the two oil holes 12a, 12b in respective. Moreover, there is a flow regulating valve being arranged at a position between each oil hole and its corresponding first chamber, i.e. the flow regulating valve 14a disposed at a position between the oil hole 12a and the first chamber 13a and the flow regulating valve 14b disposed between the oil hole 12b and the first chamber 13b, and each flow regulating valve 14a, 14b can be a device selected from the group consisting of: a capillary restrictor, an orifice restrictor, a porous restrictor, and an inherent restrictor, and can be configured on the base 10 by a process selected from the group consisting of: an assembling process and a machining process. Furthermore, each of the first chambers, i.e. the first chambers 13a, 13b, is formed as a groove into a rectangular shape, while enabling any two of the first chambers to be arranged as a pair that are disposed 180 degrees opposite to each other, as the first chambers 13a, 13b shown in FIG. 2.

In this embodiment, the self-compensating hydrostatic journal bearing 1 further comprises two second chambers 15a, 15b, being arranged in the vicinity of their corresponding first chambers 13a, 13b in respective. As shown in FIG. 3, each of the two second chambers 15a, 15b is formed as a groove into a rectangular shape that are arranged surrounding their corresponding first chambers 13a, 13b in respectively, as shown in FIG. 3. Moreover, any two of the second chambers are arranged as a pair that are disposed 180 degrees opposite to each other, as the second chambers 15a, 15b shown in FIG. 2.

In addition, the base 10 is further configured with at least two channels, i.e. the channels 16a and 16b, whereas each of the two channel 16a, 16b is configured with a first end 161a, 161b and a second end 162a, 162b in a manner that the first end 161a, 161b of each channel 16a, 16b is arranged boring through the base 10 to the circumference surface 11 and positioned neighboring to one corresponding first chamber 13a, 13b, and the second end 162a, 162b is arranged for enabling the same to be in fluid communication with one second chamber 15a, 15b that is positioned opposite to the first end 161a, 161b. In this embodiment, the first chamber 13a is arranged surrounding the first end 161a and another first chamber 13b is arranged surrounding the first end 161b, as shown in FIG. 3.

For providing the hydraulic fluid with sufficient pressure to the self-compensating hydrostatic journal bearing 1, the self-compensating hydrostatic journal bearing 1 is further connected to a hydraulic system 3 in a manner that the pressure supply tube 31 of the hydraulic system 3 is connected in fluid communication with the oil holes 12a, 12b while enabling a return tube 32 of the hydraulic system 3 to connect to the joint of the base 10 and the spindle 2 for receiving the hydraulic fluid overflowing from the gap H. It is noted that the hydraulic system 3 is known to those skilled in the art and thus is not described further herein.

It is noted that the oil holes, the first chambers and the second chambers in the present disclosure are arranged in groups, each containing two such devices, which can be exemplified by the pair of two oil holes 12a, 12b, the pair of two first chambers 13a, 13b and the pair of two second chambers 15a, 15b in the embodiment of the present disclosure.

Thus, the amount of the oil holes can be any number that is the multiple of two, depending upon the actual area size of the circumference surface 11, i.e. the diameter of the hole 100. Consequently, the amount of channels should be at least equal to that of the second chamber, or can be the number of the second chamber multiplying by two or more.

Figure 4:
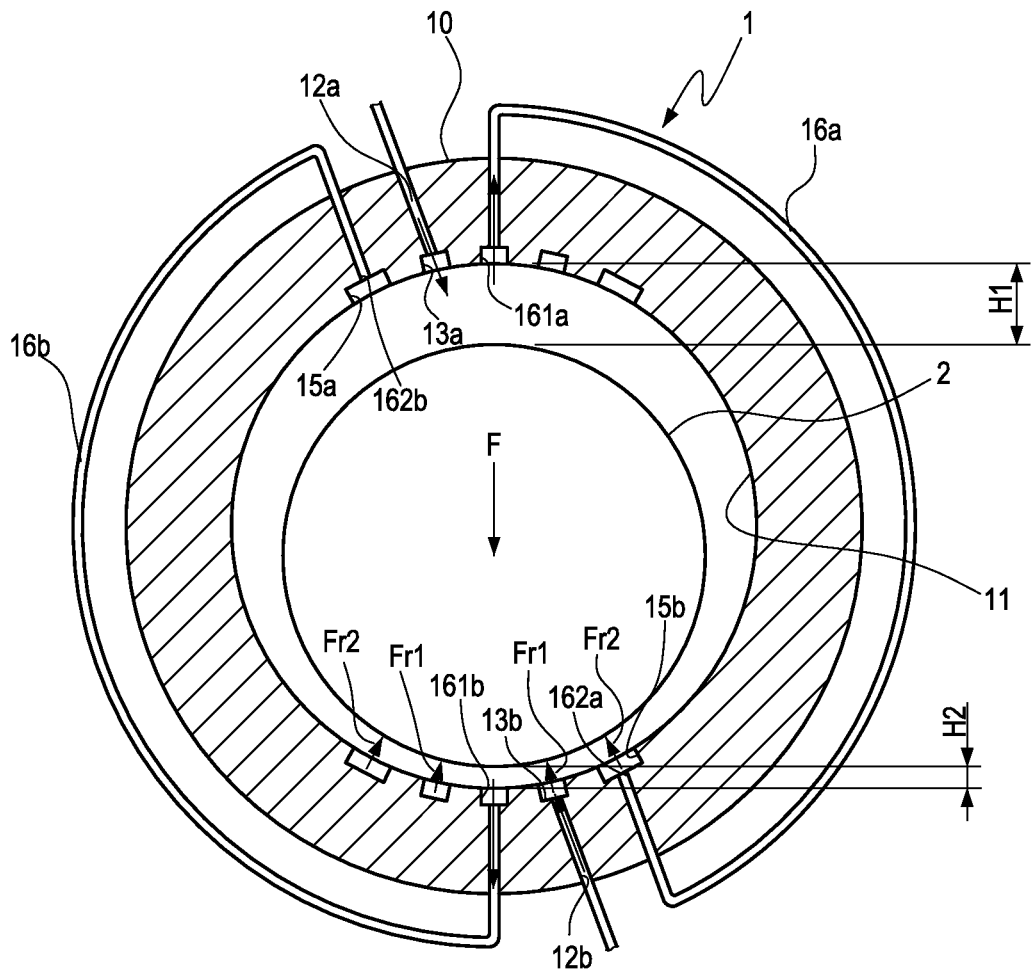
FIG. 4 is a schematic diagram showing an operating self-compensating hydrostatic journal bearing according to the present disclosure.

Please refer to FIG. 4, which is a schematic diagram showing an operating self-compensating hydrostatic journal bearing according to the present disclosure. For clarity, the gap shown in FIG. 4 is exaggerated. As shown in FIG. 4, when the spindle 2 is subjected to a force F acting in a vertical direction, the spindle 2 will be forced to bias downward for causing the gap H2 between the lower rim of the circumference surface 11 and the spindle 2 to be narrowed and than smaller than the gap H1 between the upper rim of the circumference surface 11 and the spindle 2. Since the gap H1 is enlarged, comparatively the hydraulic fluid inside the first chamber 13a can flow much easier through the gap H1, into the channel 16a from its first end 161a, and then, flow into the second chamber 15b that is disposed opposite to the first chamber 13a from the second end 162a. On the other hand, as the gap H2 is narrowed, the hydraulic fluid inside the second chamber 15b is somewhat being clogged to flow into the first chamber 13b through the gap H2 or to flow into the return tube of the hydraulic system, causing hydraulic fluid to be accumulated inside the second chamber 15b and thus resulting a counter force Fr2 to be generated for lifting the spindle 2 upward against the downward force F. Similarly, the narrowing of the gap H2 will also obstruct the hydraulic fluid, that is being supplied to flow into the first chamber 13b through the oil hole 12b, from flowing into the second chamber 15b through the gap H2, or entering into the channel 16b through its first end 161b, therefore, causing hydraulic fluid to be accumulated inside the first chamber 13b for resulting a counter force Fr1 to be generated for lifting the spindle 2 upward against the downward force F. Moreover, since the hydraulic fluid inside the first chamber 13b is obstructed from flowing into the channel 16b through the first end 161b, the amount of the hydraulic fluid flowing into the second chamber 15b from the second end 162b of the channel 16b is decreased, causing the pressure of the second chamber 15a to drop. Consequently, the hydraulic fluid inside the neighboring first chamber 13a will be drawn to flow into the second chamber 15a in response to the pressure drop, so that the amount of the hydraulic fluid respectively flowing inside the first chambers 13a, 13b, the second chambers 15a, 15b are sufficient enough for generating an effective dynamic rigidity for supporting the spindle 2 to rotate smoothly inside the base 10.

It is noted that by the self-compensating effect is enabled by the arrangement of the first chambers, the second chambers and the channels that are disposed opposite to each other while allowing each to be in fluid communication with the other that are disposed opposite thereto. In addition, as the aforesaid structures can be formed directly on the base by a machining process, the manufacturing cost of the self-compensating hydrostatic journal bearing can be reduced since the machining process is ease to perform. Moreover, as any two of the first chambers are arranged as a pair that are disposed 180 degrees opposite to each other and that is also true for the second chambers and the channels, the spindle is able to rotate in any direction without limitation, and thus the application of the present disclosure is widened.

It is obvious that other than the machining of the first chambers, the second chambers and the channels directly on the base, those structures can be modularized and being assembled onto the base. Moreover, each of the first and the second chambers can be formed as a groove in a circular shape. Such variations are not to be regarded as a departure from the spirit and scope of the disclosure, and all such modifications as would be obvious to one skilled in the art are capable of functioning the same as those described in the aforesaid embodiments.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A self-compensating hydrostatic journal bearing, comprising:
    a base, having a hole formed therein so as to be provided for receiving and mounting a spindle, while allowing a gap to be formed between the circumference surface of the hole and the spindle for a hydraulic fluid to flow therethrough;
    at least two oil holes, formed extending from the circumference of the base toward the inside of the same;
    at least two first chambers, formed on the circumference surface at positions opposite to each other for allowing each first chamber to be in fluid communication with one of the at least two oil holes;
    at least two second chambers, each being disposed on the circumference surface at a position in the vicinity of one corresponding first chamber of the at least two first chambers; and
    at least two channels, each configured with a first end and a second end in a manner that the first end of each channel is arranged boring through the base to the circumference surface and positioned neighboring to one of the at least two first chambers, and the second end of the referring channel is arranged for enabling the same to be in fluid communication with one second chamber that is positioned opposite to the first end,
    wherein each of the first chambers is arranged surrounding the first end of each channel, and each of the second chamber is arranged surrounding each first chamber.

2. The self-compensating hydrostatic journal bearing of claim 1, wherein there is a flow regulating valve being arranged at a position between each oil hole and its corresponding first chamber.

3. The self-compensating hydrostatic journal bearing of claim 2, wherein, the flow regulating valve is a device selected from the group consisting of: a capillary restrictor, an orifice restrictor, a porous restrictor, and an inherent restrictor.

4. The self-compensating hydrostatic journal bearing of claim 2, wherein each flow regulating valve is configured on the base by a process selected from the group consisting of: an assembling process and a machining process.

5. The self-compensating hydrostatic journal bearing of claim 1, wherein the first chambers are disposed 180 degrees opposite to each other.

6. The self-compensating hydrostatic journal bearing of claim 1, wherein the second chambers are disposed 180 degrees opposite to each other.

7. The self-compensating hydrostatic journal bearing of claim 1, wherein the first ends of the channels are disposed 180 degrees opposite to each other.

8. The self-compensating hydrostatic journal bearing of claim 1, wherein each first chamber is formed as a groove in a shape, that is selected from the group consisting of: a rectangle and a circle, surrounding the first end of each channel.

9. The self-compensating hydrostatic journal bearing of claim 1, wherein each second chamber is formed as a groove in a shape that is selected from the group consisting of: a rectangle and a circle, surrounding each first chamber.

10. A self-compensating hydrostatic journal bearing, comprising:
    a base, having a hole formed therein so as to be provided for receiving and mounting a spindle, while allowing a gap to be formed between the circumference surface of the hole and the spindle for a hydraulic fluid to flow therethrough;
    at least two oil holes, formed extending from the circumference of the base toward the inside of the same;
    at least two first chambers, formed on the circumference surface at positions opposite to each other for allowing each first chamber to be in fluid communication with one of the at least two oil holes;
    at least two second chambers, each being disposed on the circumference surface at a position in the vicinity of one corresponding first chamber of the at least two first chambers; and
    at least two channels, each configured with a first end and a second end in a manner that the first end of each channel is arranged boring through the base to the circumference surface and positioned neighboring to one of the at least two first chambers, and the second end of the referring channel is arranged for enabling the same to be in fluid communication with one second chamber that is positioned opposite to the first end,
    wherein each first chamber is formed as a groove in a shape, that is selected from the group consisting of: a rectangle and a circle, surrounding the first end of each channel.

11. The self-compensating hydrostatic journal bearing of claim 10, wherein there is a flow regulating valve being arranged at a position between each oil hole and its corresponding first chamber.

12. The self-compensating hydrostatic journal bearing of claim 11, wherein, the flow regulating valve is a device selected from the group consisting of: a capillary restrictor, an orifice restrictor, a porous restrictor, and an inherent restrictor.

13. The self-compensating hydrostatic journal bearing of claim 11, wherein each flow regulating valve is configured on the base by a process selected from the group consisting of: an assembling process and a machining process.

14. The self-compensating hydrostatic journal bearing of claim 10, wherein the first chambers are disposed 180 degrees opposite to each other.

15. The self-compensating hydrostatic journal bearing of claim 10, wherein the second chambers are disposed 180 degrees opposite to each other.

16. The self-compensating hydrostatic journal bearing of claim 10, wherein the first ends of the channels are disposed 180 degrees opposite to each other.

17. The self-compensating hydrostatic journal bearing of claim 10, wherein each of the first chambers is arranged surrounding the first end of each channel, and each of the second chamber is arranged surrounding each first chamber.

18. The self-compensating hydrostatic journal bearing of claim 10, wherein each second chamber is formed as a groove in a shape that is selected from the group consisting of: a rectangle and a circle, surrounding each first chamber.

* * * * *